United States Patent [19]
Gordon

[11] 4,437,066
[45] Mar. 13, 1984

[54] APPARATUS FOR SYNTHESIZING A SIGNAL BY PRODUCING SAMPLES OF SUCH SIGNAL AT A RATE LESS THAN THE NYQUIST SAMPLING RATE

[75] Inventor: Bruce E. Gordon, Santa Barbara, Calif.

[73] Assignee: Raytheon Company, Lexington, Mass.

[21] Appl. No.: 412,458

[22] Filed: Aug. 27, 1982

Related U.S. Application Data

[62] Division of Ser. No. 152,015, May 21, 1980, Pat. No. 4,349,918.

[51] Int. Cl.³ .............................................. H03K 9/06
[52] U.S. Cl. ........................................ 328/14; 328/15; 307/523
[58] Field of Search ....................... 307/523, 522, 524; 328/14, 15

[56] References Cited
U.S. PATENT DOCUMENTS

| | | | |
|---|---|---|---|
| 3,059,187 | 10/1962 | Jaffe | 307/523 |
| 3,562,556 | 2/1971 | Barber | 307/524 |
| 4,109,197 | 8/1978 | Lang et al. | 307/524 |

Primary Examiner—John S. Heyman
Attorney, Agent, or Firm—Richard M. Sharkansky; Joseph D. Pannone

[57] ABSTRACT

A digital memory system is provided wherein a received radio frequency signal is separated into a pair of quadrature signal channels, the signals in each one of the channel being sampled and stored in a digital memory at a rate substantially lower than the Nyquist sampling rate. During recall the stored samples are sequentially read from the memories at the rate at which they were stored. The samples read from the memories in each of the channels are sampled at the relatively low sampling rate and are then combined into a single channel after shifting the phase of the signals in one of the channels 90 degrees, to form a composite signal having a plurality of radio frequency signal components, each one being separated in frequency from another one by an amount having a predetermined relationship to the pulse repetition frequency of the sampling pulses; one of such radio frequency signal components having the frequency of the received signal. Means, fed by the received radio frequency signal, are provided to selectively couple only the one of the produced plurality of radio frequency signal components of the composite signal having the frequency of the received radio frequency signal to an output for retransmission.

4 Claims, 3 Drawing Figures

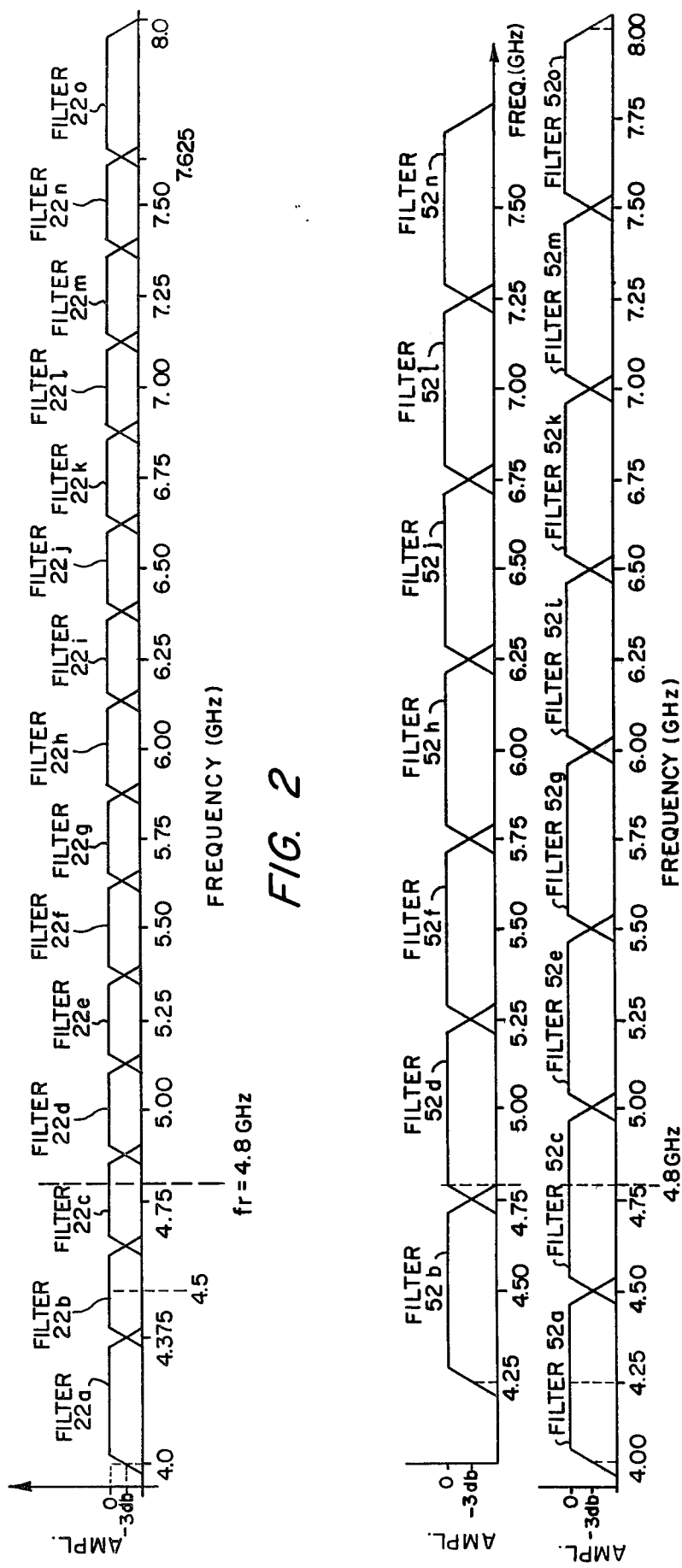

APPARATUS FOR SYNTHESIZING A SIGNAL BY PRODUCING SAMPLES OF SUCH SIGNAL AT A RATE LESS THAN THE NYQUIST SAMPLING RATE

This is a division of Application Ser. No. 152,015 filed May 21, 1980, now U.S. Pat. No. 4,349,918, issued Sept. 14, 1982.

BACKGROUND OF THE INVENTION

This invention relates generally to digital memory systems and more particularly to digital memory systems adapted to store samples of received radio frequency signals and to enable subsequent retransmission of such received radio frequency signals from the stored samples.

As is known in the art, it is frequently desired to digitally store samples of a received radio frequency signal and later reconstruct such radio frequency signal from such stored samples for retransmission. In one such system the received signal is periodically sampled at or above the Nyquist sampling rate, each sample is next converted into a corresponding digital word, and each digital word is then stored in a digital memory. When it is desired to retransmit the radio frequency signal, the stored digital words are sequentially read from the memory in the sequence in which they were stored, such read digital words are converted into corresponding voltages to produce a radio frequency signal when is then amplified and retransmitted.

With such arrangement the degree to which the retransmitted signal resembles the received radio frequency signals depends, inter alia, on sampling the received radio frequency signal at a rate at, or above, the Nyquist sampling rate. Consequently, in a system which is required to process received signals having frequencies within a predetermining bandwidth the received signal would typically be processed through a pair of quadrature channels each having a bandwidth half the predetermined bandwidth of the receiver and the samples in each channel would be taken at a rate corresponding to the predetermined bandwidth of the receiver. It follows then that the receiver bandwidth is limited by the sampling rate limits of digital components used in the memory system.

SUMMARY OF THE INVENTION

In accordance with the present invention a digital memory system is provided wherein a received radio frequency signal is separated into a pair of quadrature signal channels, the signals in each of the channels being simultaneously sampled by sampling pulses produced at a rate substantially lower than the Nyquist sampling rate. The samples in each of the channels are converted to digital words which are sequentially stored in a digital memory. During recall the stored samples in each of the digital memories are sequentially read from the memories in response to the sampling pulses. The read samples in each of the channels are simultaneously sampled by the sampling pulses. The later produced samples in one of the channels are passed through a 90 degree phase shifter and are combined with the later produced samples in the other channel to produce a composite signal having a plurality of radio frequency signal components separated in frequency one from another by an amount having a predetermined relationship to the sampling rate; one of such radio frequency signal components having the frequency of the received signal. Means, fed by the received radio frequency signal, are provided to couple the one of the produced plurality of radio frequency signal components having the frequency of the received radio frequency signal to an output for retransmission.

With such arrangement, because samples of the received radio frequency signal are taken at a rate substantially lower than that corresponding to the predetermined bandwidth of the receiver, the system is able to operate with received signals having frequencies which extend over a relatively wide bandwidth.

In a preferred embodiment of the invention, the system includes a first pair of sampling means, each one thereof being fed by sampling pulses. The received signal is separated into a pair of quadrature signal channels, the phase of the portion of the received signal fed to one of the first pair of sampling means differing 90 degrees from the phase of the portion of the received signal fed to the other one of the pair of sampling means. The sampling pulses are produced at a sampling frequency, $f_s$, which is substantially lower than the highest received signal frequency. Each one of the pair of first sampling means thereby produces a sequence of samples of the signals in each one of the channels at a rate substantially lower than the Nyquist sampling rate.

Samples of the signals in each one of the pair of channels are stored in a corresponding one of a pair of digital memories. During recall, the stored samples are sequentially read from such memories in response to the sampling pulses, the plurality of memories operating simultaneously. Such read samples are fed to a second pair of sampling means together with the sampling pulses. The samples produced by one of the second pair of sampling means are phase shifted 90 degrees and then fed to a summing network, along the samples produced by the other one of the pair of sampling means, to produce a composite signal having a plurality of radio frequency signal components, one of such radio frequency components having the frequency of the received signal and the other ones of such radio frequency signal components differing in frequency from each other by the pulse repetition frequency of the sampling pulses.

A selector means, fed by the received radio frequency signals, couples the one of the plurality of produced radio frequency signal components of the composite signal having the frequency of the received signal to an output for retransmission. In a preferred embodiment of the invention the selector means includes a plurality of input band pass filters which are tuned to contiguous portions of a predetermined band of radio frequencies, and which are fed by the received radio frequency signal. Each one of a middle portion of the plurality of input band pass filters has a bandwidth equal half the frequency of the sampling pulses. A plurality of output band pass filters tuned to overlapping portions of the predetermined band of radio frequencies is also included. Each one of the output band pass filters has a center frequency corresponding to the center frequency of one of the input band pass filters and a bandwidth equal to the pulse repetition frequency of the sampling signal. Means are included for determining which one of the input band pass filters passes the received signal and such means couples one of the produced radio frequency signal components of the composite signal to an output through a selected one of the plurality of output bandpass filters; the coupled one of the produced radio frequency signal components having the frequency of the received signal at the middle portion of its pass band. The selected one of the produced radio frequency signal components coupled to such output is then retransmitted, such retransmitted signal having the frequency of the received signal. Further, with such arrangement, if the frequency of the received signal is within the upper or lower frequency portions of one of the output filters it is also in the middle frequency portion of an overlapping output filter. Under such conditions the selector couples the one of the frequency components of the composite signal having the frequency of the received signal i.e. the desired radio frequency signal component, through the overlapping output band pass filter. Consequently, the desired radio frequency signal component passes through the middle portion of the band pass of the overlapping output filter and, in this way, if the desired radio frequency signal has some finite bandwidth such finite bandwidth signal may be passed to the output for retransmission.

BRIEF DESCRIPTION OF THE DRAWINGS

The above-mentioned and other features of the invention will become more apparent by reference to the following description taken together with the accompanying drawings in which:

FIG. 2 is a diagram showing the pass band of each of a plurality of input band pass filters used in the system of FIG. 1.

FIG. 3 is a diagram showing the pass band of each one of a plurality of output filters used in the system of FIG. 1.

DESCRIPTION OF THE PREFERRED EMBODIMENT

Figure 1:
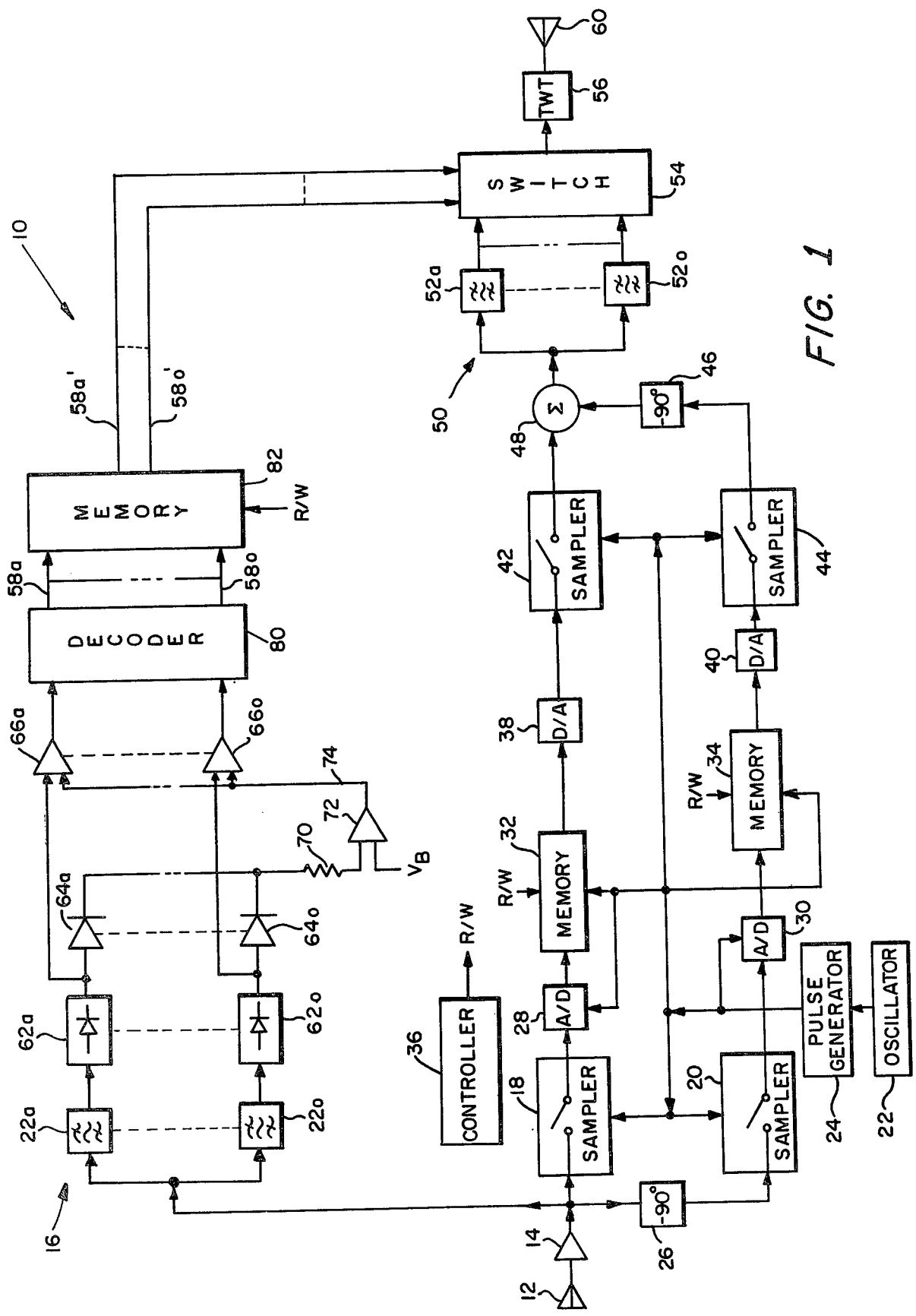
FIG. 1 is a block diagram of a digital memory system adapted to store samples of a received radio frequency signal and to retransmit such radio frequency signal from such stored samples.

Referring now to FIG. 1 a memory system 10 adapted to store samples of a received radio frequency signal and retransmit such radio frequency signal from such samples is shown, to include a receiving antenna 12, the output of which is fed to a radio frequency amplifier 14 having a predetermined bandwidth of several gigahertz, here, for example 4 to 8 GHz. The output of radio frequency amplifier 14 is fed to a bank 16 of input band pass filters, here fifteen band pass filters 22a-22o, such band pass filters being tuned to contiguous portions of the predetermined, 4 to 8 GHz, band of frequency in a manner to be described in detail in connection with FIG. 2. The amplifier 14 is also fed directly to a sampler 18 and to a sampler 20 through a 90 degree phase shifter 26, here a quadrature hybrid, as shown. Also fed to the pair of samplers 18, 20 is a series of sampling pulses produced by a pulse generator 24 and an oscillator 22. In particular, oscillator 22 is of any conventional design, and produces a sinusoidal signal, here having a frequency of 500 MHz. This signal is used to periodically trigger pulse generator 24 here a snap, or step recovery diode, to produce a train of sampling pulses for the pair of sampling means 18, 20 here such sampling pulses being produced at a rate of 0.5 GHz. Here the width of each one of the sampling pulses is less than the duration of one cycle of the highest frequency of the radio frequency signal to be passed by amplifier 14, here 8 GHz, so that the time duration of each sampling pulse is here less than 125 picoseconds.

The sampling pulses fed to sampler 18, 20 enable such samplers 18, 20 to simultaneously sample two different portions of the received signal, each portion being simultaneously sampled in each one of the quadrature signals. Thus if the received radio frequency signal fed to sampler 18 is here represented by:

$$\cos 2\pi f_r t \tag{1}$$

(where $f_r$ is the frequency of the received signal; here 8 GHz $\geq f_r \geq$ 4 GHz) the signal fed to sampler 20 may be represented as:

$$\sin 2\pi f_r t \tag{2}$$

Further, in the frequency domain, the signals fed to samplers 18, 20 may be represented as:

$$\pi[\delta(2\pi f - 2\pi f_r) + \delta(2\pi f + 2\pi f_r)] \tag{3}$$

and, $$j\pi[\delta(2\pi f + 2\pi f_r) - \delta(2\pi f - 2\pi f_r)], \tag{4}$$

respectively.

The sampling pulses may be represented as:

$$\sum_{n=-\infty}^{+\infty} \delta(t - (n/f_o)) \tag{5}$$

where such sampling pulses are here assumed to be pulses having a pulse repetition frequency, $f_o$, here 0.5 GHz. Further, in the frequency domain such sampling pulses may be represented as:

$$2\pi f_o \sum_{n=-\infty}^{+\infty} \delta(2\pi f - 2\pi n f_o) \tag{6}$$

The outputs of samplers 18, 20 may, in the frequency domain, be represented as:

$$\pi f_o \sum_{n=-\infty}^{\infty} [\delta(2\pi f - 2\pi(f_r + nf_o)) + \delta(2\pi f + 2\pi(f_r - nf_o))] \tag{7}$$

and, $$j\pi f_o \sum_{n=-\infty}^{+\infty} [\delta(2\pi f + 2\pi(f_r - nf_o)) - \delta(2\pi f - 2\pi(f_r + nf_o))] \tag{8}$$

respectively. Such signals are fed to analog to digital (A/D) converters 28, 30, respectively as shown.

The digital signals produced by A/D converters 28, 30 (represented by equations (7) and (8), respectively) are fed to a pair of digital memories 32, 34. In response to a write enable signal, W, on line R/W, produced by a conventional controller 36, and in response to the sampling pulses fed to such memories 32, 34 from pulse generator 24, the digital samples are sequentially stored in the memories 32, 34, respectively.

In response to a read enable signal, R, on the R/W line produced by controller 36, during recall, the digital samples stored in the memories 32, 34 are sequentially read from the memories 32, 34 in the same order as they were stored and at the 500 MHz rate in response to sampling pulses produced by the 500 MHz sampling pulses produced by pulse generator 24. The digital samples sequentially read from the memories 32, 34 here pass through a pair of digital to analog (D/A) converters 38, 40, respectively, as shown. It follows then that the signals produced by the D/A converters 38, 40 are signals equivalent to the sampled signals produced by samplers 18, 20 except that the memories 32, 34 provide zero order hold circuits which effectively filter frequency components greater than $f_o/2$, here 250 MHz, represented by equations (7) and (8), respectively.

It follows then from (7) and (8) that the dominant frequency component of the signals produced by D/A converters 38, 40 will be at a frequency $(f_r - n_x f_o)$ where $n_x$ is an integer and $(f_o + f_r)/f_o \geq n_x \geq (f_r - f_o)/f_o$. Therefore the signals produced by D/A converters 38, 40 may be represented as:

$$\cos 2\pi(f_r - n_x f_o)t \qquad (9)$$

and, $$\sin 2\pi(f_r - n_x f_o)t, \qquad (10)$$

respectively.

Alternatively, the frequency components of the signals produced by D/A converters 38, 40 may be represented, in the frequency domain, as:

$$\delta[2\pi f - 2\pi(f_r - n_x f_o)] + \delta[2\pi f + 2\pi(f_r - n_x f_o)] \qquad (11)$$

and, $$\delta[2\pi f + 2\pi(f_r - n_x f_o)] - \delta[2\pi f - 2\pi(f_r - n_x f_o)] \qquad (12)$$

respectively.

The signals produced at the outputs of D/A converters 38, 40 are fed to a second pair of samplers 42, 44, respectively, as shown. The sampling pulses produced by pulse generator 24 are fed to samplers 42, 44, as shown. It follows that the frequency components signals produced at the outputs of samplers 42, 44 may be represented as:

$$\sum_{n=-\infty}^{\infty} \{\delta[2\pi f - 2\pi(f_r - n_x f_o) - nf_o] + \qquad (13)$$

$$\delta[2\pi f + 2\pi(f_r - n_x f_o) - nf_o]\} \text{ and}$$

$$\sum_{n=-\infty}^{\infty} \{\delta[2\pi f + 2\pi(f_r - n_x f_o) - nf_o] - \qquad (14)$$

$$\delta[2\pi f - 2\pi(f_r - n_x f_o) - nf_o]\},$$

respectively.

It also follows that the signals produced at the outputs of samplers 42, 44 may be, in the time domain, represented as:

$$\sum_{n=0}^{\infty} \{\cos 2\pi[(f_r - n_x f_o) - nf_o]t + \cos 2\pi[(f_r - n_x f_o) - nf_o]t\} \qquad (15)$$

and $$\sum_{n=0}^{\infty} \{\sin 2\pi[(f_r - n_x f_o) + nf_o]t + \sin 2\pi[(f_r - n_x f_o) - nf_o]t\} \qquad (16)$$

respectively.

The signals produced at the outputs of samplers 42, 44 are fed to a summing network 48, the signals produced by sampler 44 first being fed to a 90° phase shifter 46, as shown. It follows then, from equations (15) and (16) that the output of summing network 48 is a composite signal made up of a plurality of radio frequency signal components which may be represented as:

$$\sum_{n=0}^{\infty} \cos 2\pi[(f_r - n_x f_o) + nf_o]t; \qquad (17)$$

the plurality of radio frequency signal components being separated in frequency from each other an amount in predetermined relationship to the selected sampling rate; here such components being separated one from another by the sampling frequency of the sampling pulses produced by pulse generator 24, here $f_o = 500$ MHz. It is also noted that one of the radio frequency signal components of the composite signal has the frequency of the received radio frequency signal; the one of the radio frequency signals represented in equation (17) when $nf_o = n_x f_o$.

The composite signal produced at the output of summing network 48 is fed to a bank of output filters 50, here a bank of filter output band pass filters 52a-52o having overlapping pass band frequencies over the predetermined bandwidth here 4 to 8 GHz, as shown in FIG. 3. Band pass filters 52a-52o each have a bandwidth equal to the frequency separation of the frequency components of the composite signal so that only one of such components can pass through any one of the filters 52a-52o here 500 MHz. The center frequencies of such filters 52a-52o are here 4.25 GHz; 4.5 GHz; 4.75 GHz, ... 7.75 GHz, respectively, as indicated in FIG. 3. The outputs of output filters 52a-52o are fed to a switch 54, as shown in FIG. 1. Switch 54 is here any conventional radio frequency switch adapted to couple the output of one of the band pass filters 52a-52o to a radio frequency amplifier, here a travelling wave tube (TWT) 56 selectively in response to a logical control signal on lines 58'a-58'o. The generation of the logical control signal will be described hereinafter. Suffice it to say here, however, such switch 54, in response to such logical control signals, couples the one of the output filters 52a-52o having in the middle portion of its pass band the frequency of the received signal and thereby couples the one of the plurality of each frequency signal produced at the output of summing network 48 through such selected one of the output filters to TWT 56. The other ones of the plurality of produced radio frequency signals are rejected by the operation of the switch 54 and hence are not coupled to the TWT 56. The one of the produced radio frequency signals having the frequency of the received signal is amplified by the TWT 56 and retransmitted via transmitting antenna 60.

In operation, and considered as an example a received signal having a frequency $f_r = 4.8$ GHz, from the discussion above such signal may be represented as:

$$E_r = \cos 2\pi(4.8 \times 10^9)t \qquad (18)$$

The frequency components of the signals produced by sampler 18 may from eq (7) be represented, in the frequency domain, as:

$$\sum_{n=-\infty}^{\infty} [\delta(2\pi f - 2\pi(4.8 + .5n)10^9) + \delta(2\pi f + 2\pi(4.8 - .5n)10^9)] \qquad (19)$$

and the frequency components of the signals produced at the output of sampler 20 may from eq (8) be represented as:

$$\sum_{n=-\infty}^{\infty} [\delta(2\pi f + 2\pi(4.8 - .5n) \times 10^9) - \quad (20)$$

$$\delta(2\pi f - 2\pi(4.8 + .5n) \times 10^9)]$$

The sampled signals pass through A/D converters 28, 30 and are stored in memories 32, 34 here at a rate of 0.5 GHz as described above. During recall the samplers read from the memories 32, 34, are converted to analog signals by D/A converters 38, 40. The dominant frequency components of the analog signals may, from equations (10) and (12) be represented as:

$$\delta[2\pi f - 2\pi(4.8-5.0)\times 10^9] + \delta[2\pi f + 2\pi(4.8-5.0)\times 10^9] \quad (21)$$

and, $$\delta[2\pi f - 2\pi(4.8-5.0)\times 10^9] - \delta[2\pi f - 2\pi(4.8-5.0)\times 10^9] \quad (22)$$

where, here $n_x = 10$.

The analog signals are fed to the second pair of samplers 42, 44 to produce a plurality of signals having frequency components which may be represented from eqs (11) and (12) as:

$$\sum_{n=-\infty}^{\infty} \delta[2\pi f + 2\pi(1.2) \times 10^9 - nf_o)] + \quad (23)$$

$$\delta[2\pi f + 2\pi[(-.2) \times 10^9 - nf_o] \text{ and,}$$

$$\sum_{n=-\infty}^{\infty} \delta[2\pi f - 2\pi((-.2) \times 10^9 - nf_o)] - \quad (24)$$

$$\delta[2\pi f - 2\pi((-.2) \times 10^9 - nf_o)]$$

respectively.

The signal produced at the output of sampler 42 and phase shifter 96 are added together in summing network 48 to produce a composite signal which, from eq (17), may be represented as:

$$\sum_{n=0}^{\infty} \cos 2\pi[(.5n - .2) \times 10^9]t \quad (25)$$

From eq (25) it follows that the composite signal has the following frequency components: 0.2 GHz; 0.7 GHz; . . . 3.8 GHz, 4.3 GHz, 4.8 GHz, 5.3 GHz, 7.8 GHz, . . . . It is further observed that the frequency components are separated one from another by an amount having a predetermined relationship to the known sampling rate; here such components being separated one from another by the 0.5 GHz sampling rate. For reasons discussed above, the details of which will become apparent hereinafter, the logical control signals fed to switch 54 via lines 58'a-58'o selectively couple the one of the output band pass filters, here filter 52c, having a bandwidth from 4.5 GHz to 5.0 GHz as shown in FIG. 3, to TWT 56. It follows then that only one of the plurality of radio frequency signals of the composite signal produced by summing network 48 passes to TWT 56, such passed signal having the same frequency of the received signal; here a frequency of 4.8 GHz.

Referring again to FIG. 1, as described above a portion of the received radio frequency signal is fed to a bank of filters 16, here made up of fifteen band pass filters 22a-22o tuned to contiguous portions of the 4 GHz to 8 GHz bandwidths as shown in FIG. 2. Each one of the band pass filters 22b-22n has a pass band of 250 MHz; the center frequencies of filters 22b to 22n here being 4.5 to 7.5 GHz, respectively, as shown in FIG. 2. Filters 22a and 22o here have a band pass of 375.0 MHz; the center frequency of band pass filter 22a being 4.1875 GHz and the center frequency of band pass filter 22o here being 7.8125 GHz. As shown in FIG. 1 the outputs of band pass filters 22a to 22o are fed to corresponding ones of a plurality of detectors 62a to 62o, respectively, as shown. The outputs of detectors 62a to 62o are fed to corresponding ones of a plurality of comparators 66a to 66o, respectively as shown and a corresponding plurality of diodes 64a to 64o, as shown. The outputs of diodes 64a to 64o are coupled together and through a resistor 70 to a summing amplifier 72 as shown. Also fed to the amplifier 72 is a bias voltage $V_B$, here providing a voltage equal to the voltage drop produced across a forward biased one of the diodes 64a to 64o, for reasons to become apparent.

In operation, if the received radio frequency signal passes through one of the band pass filters 22a to 22o, say for example filter 22a, a relatively large detected voltage is produced at the input of diode 64a to forward bias such diode; the remaining diodes 64b to 64o being fed will relatively low voltages remaining back biased. The detected voltage at the input to diode 64a is coupled to amplifier 72. The level of such detected voltage is however reduced by the voltage drop produced across diode 64a. The original detected voltage level is however restored by the $V_B$ bias voltage also fed to amplifier 72 so that the voltage produced at the output of amplifier 72 on line 74 has the same level as the detected voltage fed to the input of diode 64a. Each one of the comparators 66a to 66o here produce a logical 1 signal when the levels of the signals fed to it are equal and produce a logical 0 signal when the levels of the signals fed to it from the one of the detectors 62a to 62o coupled to it is less than the level of the signal fed to it by line 74. Hence, in the example where filter 72a passes the received signal, comparator 66a produces a logical 1 signal and comparators 66b to 66o produce logical 0 signals. It follows then, in the general case, that the logical signals produced by comparators 66a to 66o provide an indication of the one of the filters 22a-22o passing the received radio frequency signal. It is also noted that if the receiving signal has a frequency which passes through a pair of filters having adjacent pass bands logical 1 signals will be produced by a pair of the comparators 64a to 66o. Decoder 80 is provided to resolve the ambiguity; here such decoder 80 is designed to indicate that the received signal has in effect, passed through the one of the pair of filters 22a to 22o having the lowest pass band. In particular, decoder 80 includes here, fifteen output lines 58a to 58o and produces the following logical signals in response to the following logical signals produced by comparators 66a to 66o;

TABLE I

| COMPARATOR | | | | | | | | LINE | | | | | | |
|---|---|---|---|---|---|---|---|---|---|---|---|---|---|---|
| 66a | 66b | 66c | 66d | — | 66m | 66n | 66o | 58a | 58b | 58c | — | 58m | 58n | 58o |
| 1 | 0 | 0 | 0 | — | 0 | 0 | 0 | 1 | 0 | 0 | — | 0 | 0 | 0 |

TABLE I-continued

| COMPARATOR | | | | | | | | LINE | | | | | | |
|---|---|---|---|---|---|---|---|---|---|---|---|---|---|---|
| 66a | 66b | 66c | 66d | — | 66m | 66n | 66o | 58a | 58b | 58c | — | 58m | 58n | 58o |
| 1 | 1 | 0 | 0 | — | 0 | 0 | 0 | 1 | 0 | 0 | — | 0 | 0 | 0 |
| 0 | 1 | 0 | 0 | — | 0 | 0 | 0 | 0 | 1 | 0 | — | 0 | 0 | 0 |
| 0 | 1 | 1 | 0 | — | 0 | 0 | 0 | 0 | 1 | 0 | — | 0 | 0 | 0 |
| 0 | 0 | 1 | 0 | — | 0 | 0 | 0 | 0 | 0 | 1 | — | 0 | 0 | 0 |
| 0 | 0 | 1 | 1 | — | 0 | 0 | 0 | 0 | 0 | 1 | — | 0 | 0 | 0 |
| , | , | , | , | — | , | , | , | , | , | , | — | , | , | , |
| , | , | , | , | — | , | , | , | , | , | , | — | , | , | , |
| 0 | 0 | 0 | 0 | — | 1 | 0 | 0 | 0 | 0 | 0 | — | 1 | 0 | 0 |
| 0 | 0 | 0 | 0 | — | 1 | 1 | 0 | 0 | 0 | 0 | — | 1 | 0 | 0 |
| 0 | 0 | 0 | 0 | — | 0 | 1 | 0 | 0 | 0 | 0 | — | 0 | 1 | 0 |
| 0 | 0 | 0 | 0 | — | 0 | 1 | 1 | 0 | 0 | 0 | — | 0 | 1 | 0 |
| 0 | 0 | 0 | 0 | — | 0 | 0 | 1 | 0 | 0 | 0 | — | 0 | 0 | 1 |

In this way, only one of the lines 58a–58m may be logical 1 in response to a received signal having a frequency within the 4 to 8 GHz band.

The logical signals produced on lines 58a to 58o are fed to a memory 82 and are stored therein when the digital samples of the beat frequency signals passing through low pass filters 28, 30 are stored in memories 32, 34 in response to a write (W) signal on line R/W. During recall, i.e. when a read signal (R) is produced on line R/W, the stored logical signals stored in the memory 82 are read therefrom and produced on lines 58'a to 58'o, such signals being produced during the period of time the stored samples stored in memories 32, 34 are read therefrom. Lines 58'a to 58'o contain the same logical signals produced on lines 58a to 58o, respectively, and hence the signals produced on lines 58'a to 58'o are in accordance with signals on lines 58a to 58o, respectively as presented in the TABLE I referred to above. Switch 54 responds to the logical signals in accordance with TABLE II, below, to couple one of the output band pass filters 52a to 52o to the TWT 56:

TABLE II

| LINE | | | | | FILTER COUPLED TO TWT 56 |
|---|---|---|---|---|---|
| 58'a | 58'b | — | 58'm | 58'n | |
| 1 | 0 | — | 0 | 0 | 52a |
| 0 | 1 | — | 0 | 0 | 52b |
| , | , | — | , | , | , |
| , | , | — | , | , | , |
| 0 | 0 | — | 1 | 0 | 52n |
| 0 | 0 | — | 0 | 1 | 52o |

In operation, and referring also to FIGS. 2 and 3 and considering also the example above where the received signal has a frequency equal to 4.8 GHz, it is noted that such signal will pass through input filter 22c. As a result of the received signal passing through input filter 22c a logical 1 signal is produced by comparator 66c and logical 0 signals will be produced by comparators 66a to 66b and 66d to 66c. As a result of these logical signals a logical 1 signal is produced on lines 58c and logical 0 signals are produced on lines 58a, 58b and 58d to 58c, as indicated in Table I. During recall, while the composite signal produced by summing network 48 has a plurality of radio frequency signal components here, from eq (25), frequency components including frequencies of: 3.8 GHz; 4.3 GHz; 4.8 GHz; 5.3 GHz; 7.8 GHz as described above, the logical 1 signal produced on line 58'c and the logical 0 signals on lines 58'a, 58'b and 58'd to 58'o cause filter 52c to become coupled to TWT 56 as described in accordance with TABLE II (filters 52a, 52b and 52c to 52o being electrically decoupled from TWT 56 in response to such logical signals). It follows then that, referring to FIG. 3, the one of the produced radio frequency signal components of the composite signal having the frequency of 4.8 GHz is passed to the TWT 56 for retransmission; all other ones of the produced radio frequency signal components of the composite signal being electrically decoupled from TWT 56.

It is noted that the arrangement of the pass bands of input filters 22a to 22o and the pass bands of output filters 52a to 52o, as shown in FIGS. 2 and 3, is such that if the received signal has a frequency which is at the cut off frequency of a pair of output filter having adjacent band pass frequencies, i.e. for example, a received signal having a frequency of 5.0 GHz which is at the cut off frequency of both output filter 52c and output filter 52e, the received radio frequency signal will pass through input filter 22d to cause switch 54 to couple output filter 52d to TWT 56. In this way, the one of the plurality of radio frequency signals produced by summing network 58, having the 5.0 GHz frequency pass through filter 52d, and in particular such one of the produced radio frequency signals will pass through the middle portion of the output filter 52d. Consequently, the system 10 ensures that only one of the plurality of radio frequency signal components of the composite signal produced at the output of summing network 48 will pass to the TWT 56 and that with this arrangement of input filter pass bands and output filter pass bands the produced radio frequency signal component desired for retransmission passes through the middle portion of the selected one of the output filters 52a to 52o and thereby enables such system 10 to retransmit a radio frequency signal having some finite bandwidth.

Having described a preferred embodiment of the invention other embodiments incorporating these concepts may now become readily apparent to those of skill in the art. It is felt, therefore, that the invention should not be limited to the disclosed embodiment but should be limited only by the spirit and scope of the appended claims.

What is claimed is:

1. In combination:
   (a) means for producing samples of a signal having a frequency f, such samples being produced at a predetermined sampling rate $f_o$, where $f_o$ is less than 2f, such produced samples having a plurality of frequency components separated in frequency one from another by an amount having a predetermined relationship to the sampling rate, one of such frequency components having the frequency f; and
   (b) means, responsive to a signal indicative of the frequency f and fed by the train of produced samples, for coupling the one of the produced plurality of frequency components having the frequency f to an output.

2. A system comprising:
(a) means for producing samples of a signal having a frequency f, such samples being produced in a plurality of signal channels, the samples in each one of the channels being produced at a sampling rate $f_o$ less than 2f;
(b) means for combining the samples produced into the plurality of signal channels into a composite signal having a plurality of frequency components separated in frequency one from another by an amount having a predetermined relationship to the sampling rate, one of such frequency components having the frequency f; and
(c) means, responsive to a signal indicative of the frequency f and fed by the composite signal, for coupling the one of the plurality of frequency components of the composite signal having the frequency f to an output.

3. A system comprising:
(a) a plurality of signal channels, each one thereof including means for producing samples of a signal having a frequency f, at a predetermined sampling rate, $f_o$, the signals in the plurality of signal channels having a predetermined phase shift therebetween;
(b) means for combining the samples produced in the plurality of signal channels into a composite signal having a plurality of frequency components separated in frequency one from another by an amount having a predetermined relationship to the sampling rate, one of such frequency components having the frequency f; and
(c) means, responsive to a signal indicative of the frequency f and fed by the composite signal, for coupling the one of the plurality of frequency components of the composite signal having the frequency f to an output.

4. The system recited in claim 3 wherein the sample producing means includes means for producing such samples in each one of the channels at a sampling rate less than 2f.

* * * * *

UNITED STATES PATENT OFFICE
CERTIFICATE OF CORRECTION

Patent No. 4,437,066          Dated March 13, 1984

Inventor(s) Bruce E. Gordon

It is certified that error appears in the above-identified patent and that said Letters Patent are hereby corrected as shown below:

Equation 16, Column 5, Line 58:

Change

" $\sum_{n=0}^{\infty} \{\sin 2\pi[(f_r-n_x f_o) + nf_o]t + \sin 2\pi[(f_r-n_x f_o)-nf_o]t\}$ "

to

-- $\sum_{n=0}^{\infty} \{-\sin 2\pi[(f_r-n_x f_o) + nf_o]t + \sin 2\pi[(f_r-n_x f_o)-nf_o]t\}$ --;

and,

Column 10, Line 35: Change "58" to --48--.

Signed and Sealed this

Seventeenth Day of June 1986

[SEAL]

Attest:

DONALD J. QUIGG

Attesting Officer      Commissioner of Patents and Trademarks